(12) United States Patent
Peebles

(10) Patent No.: US 11,866,273 B2
(45) Date of Patent: Jan. 9, 2024

(54) MAGNETIC POUCH CLAMP ASSEMBLY AND RELATED METHODS

(71) Applicant: BARTELT PACKAGING LLC, Covington, KY (US)

(72) Inventor: Donald Scott Peebles, Bradenton, FL (US)

(73) Assignee: BARTELT PACKAGING LLC, Sarasota, FL (US)

( * ) Notice: Subject to any disclaimer, the term of this patent is extended or adjusted under 35 U.S.C. 154(b) by 79 days.

(21) Appl. No.: 17/545,527

(22) Filed: Dec. 8, 2021

(65) Prior Publication Data

US 2022/0212885 A1 Jul. 7, 2022

Related U.S. Application Data

(63) Continuation-in-part of application No. 17/143,744, filed on Jan. 7, 2021.

(51) Int. Cl.
*B65G 47/92* (2006.01)
*B65B 43/54* (2006.01)
*B65B 67/12* (2006.01)

(52) U.S. Cl.
CPC .............. *B65G 47/92* (2013.01); *B65B 43/54* (2013.01); *B65B 67/1233* (2013.01); *B65G 2201/0235* (2013.01)

(58) Field of Classification Search
None
See application file for complete search history.

(56) References Cited

U.S. PATENT DOCUMENTS

| | | |
|---|---|---|
| 6,386,609 B1 | 5/2002 | Govzman |
| 7,784,603 B2 | 8/2010 | Burgmeier |
| 8,128,142 B2 | 3/2012 | Glotzl |
| 8,297,671 B2 | 10/2012 | Knieling |
| 8,342,314 B2 | 1/2013 | Michel |
| 8,387,773 B2 | 3/2013 | Fahldieck |
| 8,424,940 B2 | 4/2013 | Sarda |
| 8,465,070 B2 | 6/2013 | Knieling |
| 8,556,317 B2 | 10/2013 | Bodtlander |
| 8,672,376 B1 | 3/2014 | Wilson |
| 8,701,872 B2 | 4/2014 | Fahldieck |

(Continued)

FOREIGN PATENT DOCUMENTS

EP 2522584 A1 11/2012

*Primary Examiner* — Kavel Singh
(74) *Attorney, Agent, or Firm* — THOMPSON HINE LLP

(57) ABSTRACT

A magnetic pouch clamp assembly includes a first and second clamping arms and a magnet assembly. The first clamping arms have respective, opposed first and second clamping surfaces. The second clamp arm is slidably connected to the first clamping arm such that the first and second clamping arms are movable between open and closed positions, with the first and second clamping surfaces being engaged in the closed position. The magnet assembly includes a first magnet having a first polarity carried by the first clamping arm and a second magnet having a second polarity carried by the second clamping arm, the first and second polarities being oriented such that a closing attractive force therebetween holds the first and second clamping surfaces in the closed position. A third magnet can be used to hold the clamping surfaces in the open position or to enhance closing forces.

16 Claims, 12 Drawing Sheets

(56) References Cited

U.S. PATENT DOCUMENTS

| | | |
|---|---|---|
| 8,794,425 B2 | 8/2014 | Fahldieck |
| 8,833,824 B2 | 9/2014 | Fahldieck |
| 8,894,114 B2 * | 11/2014 | Fahldieck ............... B67C 3/242 294/90 |
| 9,102,479 B2 | 8/2015 | Schulnig |
| 9,463,591 B2 | 10/2016 | Winzinger |
| 9,643,795 B2 | 5/2017 | Volkers |
| 9,774,221 B1 | 9/2017 | Holland |
| 9,878,483 B2 | 1/2018 | Leroux |
| 10,315,904 B2 | 6/2019 | Landler |
| 10,899,558 B2 | 1/2021 | Berceanu |
| 2013/0152516 A1 | 6/2013 | Sammons |

* cited by examiner

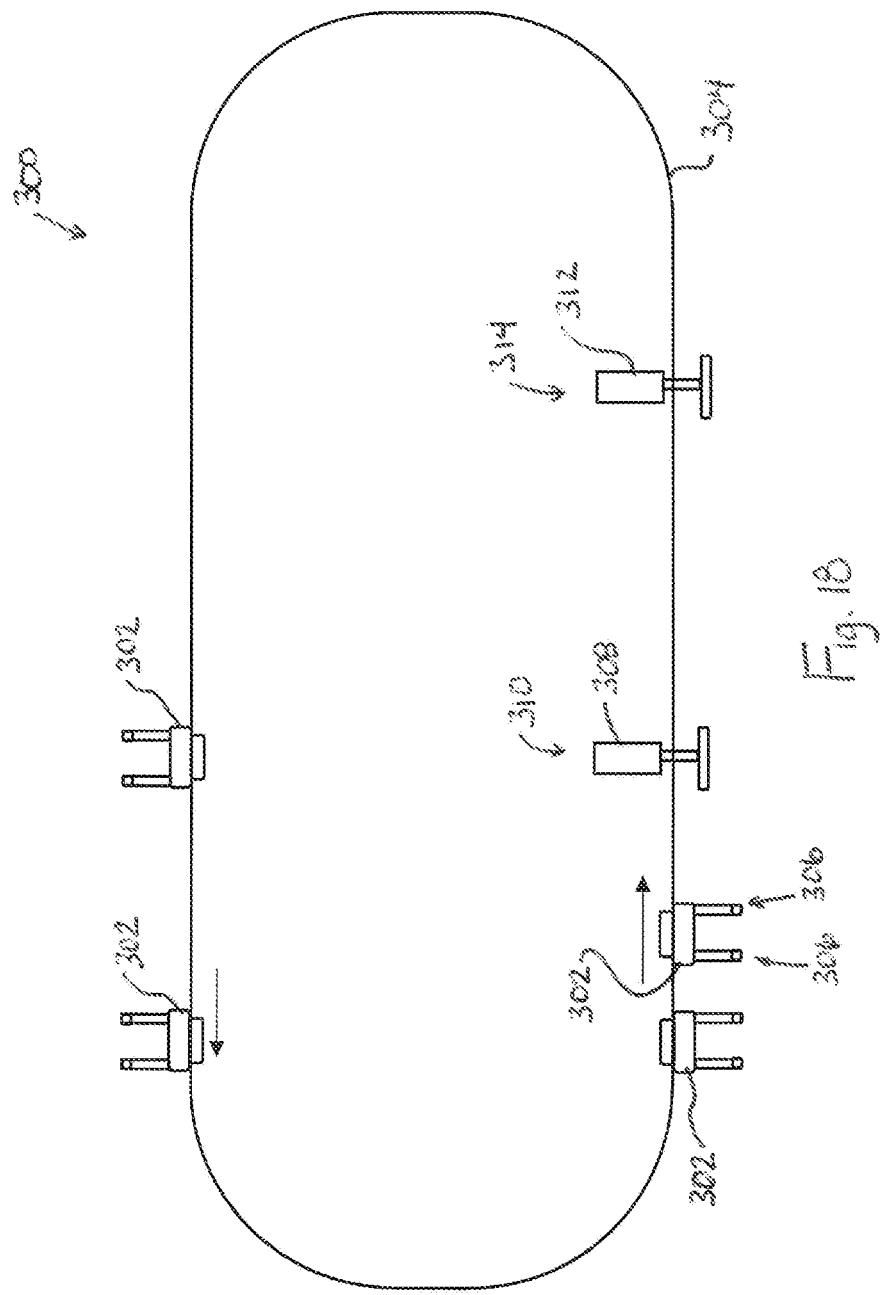

MAGNETIC POUCH CLAMP ASSEMBLY AND RELATED METHODS

FIELD OF THE INVENTION

The present invention relates to pouching machines, and more particularly, to clamps for releasably holding the pouches through forming, filling and/or sealing operations.

BACKGROUND OF THE INVENTION

Most pouching machines employ pairs of track-mounted clamps which successively receive pouches and carry them to various stations where different operations are performed on the pouches, typically including filling and sealing and, depending on the type of pouching machine, initial forming operations. The clamps then release the filled and sealed pouches, which may be grouped and loaded in cartons or subject to further processing.

Most commonly, each clamp is held closed by spring pressure and, when receiving or releasing pouches, the clamp is urged open by application of an external mechanical force. While such clamps have been effectively used for many years, further improvements are possible.

SUMMARY OF THE INVENTION

According to one aspect, a magnetic pouch clamp assembly comprises: a first clamping arm having a first clamping surface; a second clamping arm having a second clamping surface opposed to the first clamping surface, the second clamping arm being slidably connected to the first clamping arm such that the first and second clamping arms are movable between open and closed positions, the first and second clamping surfaces being engaged in the closed position; a magnet assembly including a first magnet having a first polarity carried by the first clamping arm and a second magnet having a second polarity carried by the second clamping arm, the first and second polarities being oriented such that a closing attractive force therebetween holds the first and second clamping surfaces in the closed position.

In one implementation of the preceding aspect, the magnet assembly includes a third magnet having a third polarity carried by the second clamping arm, the second and third magnets being located on opposite sides of the first magnet and the first and third polarities being oriented such that an opening attractive force therebetween holds the first and second clamping surfaces in the open position.

In on implementation of the assembly of either of the preceding paragraphs, the first clamping arm defines a first guide slot and the second clamping arm defines a second guide slot, the first clamping arm includes a first magnet housing slidably received in the second guide slot and carrying the first magnet, and the second clamping arm includes a second magnet housing slidably received in the first guide slot and carrying the second magnet.

In on implementation of the assembly of any of the preceding paragraphs, the first magnet housing includes opposite sides within the second guide slot, wherein each of the opposite sides carries a plastic bearing in sliding contact with the second guide slot, wherein the second magnet housing includes opposite sides within the first guide slot, wherein each of the opposite sides of the second magnet housing carries a plastic bearing in sliding contact with the first guide slot.

In on implementation of the assembly of any of the preceding paragraphs, the magnet assembly includes a third magnet having a third polarity carried by the second clamping arm, the second and third magnets being located on opposite sides of the first magnet and the first and third polarities being oriented such that an opening attractive force therebetween holds the first and second clamping surfaces in the open position; and wherein the first clamping arm defines a third guide slot and the second clamping arm includes a third magnet housing slidably received in the third guide slot and carrying the third magnet.

In on implementation of the assembly of any of the preceding paragraphs, one of the first and second clamping arms includes mounting holes for mounting to a carriage.

In on implementation of the assembly of any of the preceding paragraphs, a first clamping arm distal end extends beyond a second clamping arm distal end, the first clamping arm distal end including a first end lateral extension, the first clamping surface being located on the lateral extension and facing the second clamping surface on the second clamping arm distal end.

In on implementation of the assembly of any of the preceding paragraphs, the second clamping arm distal end includes a second end lateral extension extending away from the first clamping arm and angled away from the second clamping surface.

In on implementation of the assembly of any of the preceding paragraphs, the first and second clamping surfaces are textured to increase grip.

In on implementation of the assembly of any of the preceding paragraphs, the first and second magnets are permanent magnets.

In on implementation of the assembly of any of the preceding paragraphs, the first clamping arm overlies the second clamping arm, wherein the second magnet housing extends upward into the first guide slot, wherein the first magnet housing extends downward into the second guide slot.

In on implementation of the assembly of any of the preceding paragraphs, at least one of the first clamping arm or the second clamping arm includes at least one slide slot, wherein a fastener extends through the slide slot and into the other of the first clamping arm or the second clamping arm to hold the first and second clamping arms together, wherein the fastener includes a shaft portion within the slide slot, wherein the shaft portion interacts with an end of the slide slot for limiting relative sliding movement between the first clamping arm and the second clamping arm.

In on implementation of the assembly of any of the preceding paragraphs, the first magnet housing includes a first magnet housing retention lug at a first magnet housing distal end and the second guide slot includes a second guide slot retention lug passage extending across a width thereof, engagement between the first magnet housing retention lug and the second clamping arm preventing removal of the first magnet housing from the second guide slot except when the first magnet housing retention lug and the and the second guide slot retention lug passage are aligned.

In on implementation of the assembly of any of the preceding paragraphs, the second clamping arm includes a second clamping arm guide slot cover connected thereto outwardly of the first magnet housing retention lug, the second clamping arm guide slot cover having a magnet housing blocking protrusion extending inwardly therefrom positioned to prevent the first magnet housing retention lug from sliding into aligned with the second guide slot retention lug passage.

In on implementation of the assembly of any of the preceding paragraphs, the second magnet housing includes a second magnet housing retention lug at a second magnet housing distal end and the first guide slot includes a first guide slot retention lug passage extending across a width thereof, engagement between the second magnet housing retention lug and the first clamping arm preventing removal of the second magnet housing from the first guide slot except when the second magnet housing retention lug and the and the first guide slot retention lug passage are aligned.

In a further aspect, a pouch handling system includes a carriage mounted for movement along a continuous conveyor track. The magnetic pouch clamp assembly of any of the preceding paragraphs is mounted to the carriage for movement therewith. A first assembly actuator positioned at a pouch drop location along the continuous conveyor track, the first assembly actuator configured to interact with the magnetic pouch clamp assembly to shift the first and second clamping arms to the open position for pouch dropping. A second assembly actuator positioned at a pouch receive location along the continuous conveyor track, the second assembly actuator configured to interact with the magnetic pouch clamp assembly to shift the first and second clamping arms to the closed position for pouch holding. The system is configured such that the magnetic pouch clamp assembly (i) receives a pouch at the pouch receive location, (ii) drops the pouch at the pouch drop location and (iii) remains in the open position while traversing along the continuous conveyor track from the pouch drop location back to the pouch receive location to receive another pouch.

These and other objects, aspects and advantages of the present invention will be better appreciated in view of the drawings and following detailed description of preferred embodiments.

BRIEF DESCRIPTION OF THE DRAWINGS

FIG. 18 is a schematic plan view a pouch handling system employing magnetic pouch clamp assemblies.

DETAILED DESCRIPTION OF PREFERRED EMBODIMENTS

Figure 1:
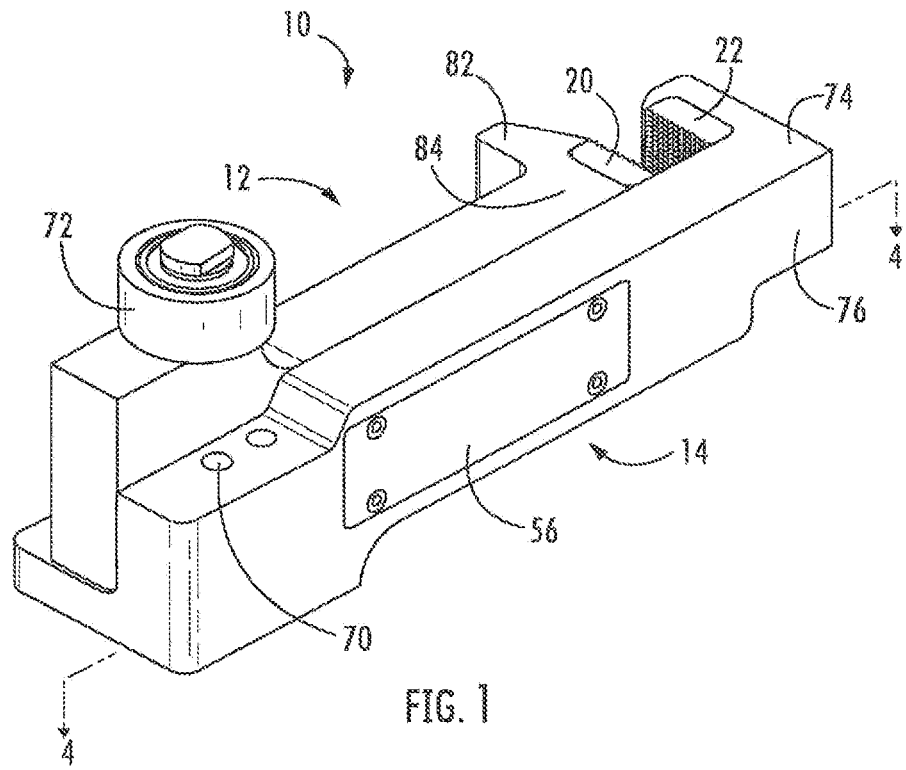
FIG. 1 is a perspective view of a magnetic pouch clamp assembly, according to an embodiment of the present invention.
Figure 2:
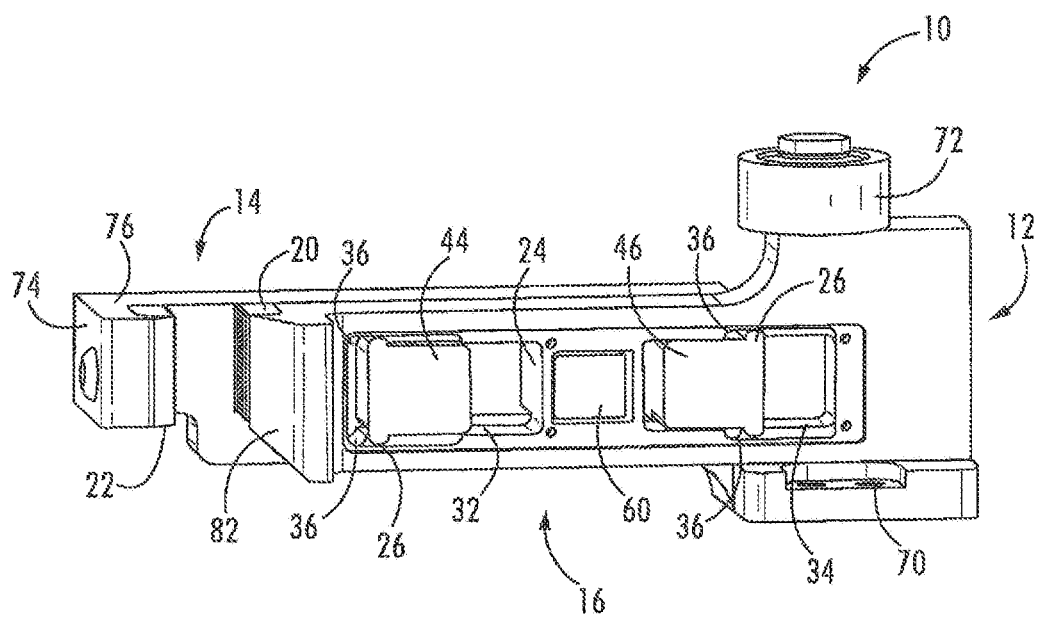
FIG. 2 is another perspective view of the magnetic pouch clamp assembly of FIG. 1, with a guide slot cover removed to show internal details.
Figure 3:
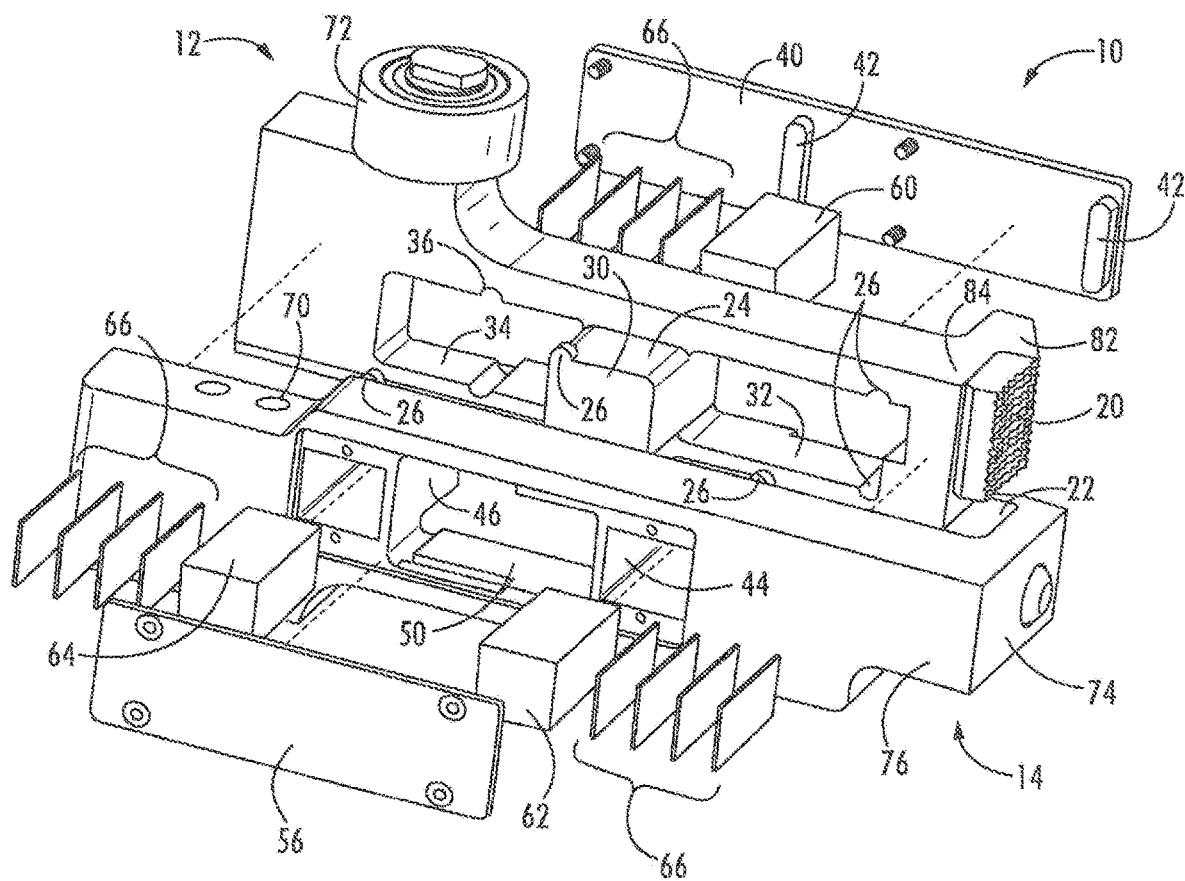
FIG. 3 is a partially exploded perspective view of the magnetic pouch clamp assembly of FIG. 1.
Figure 4A:
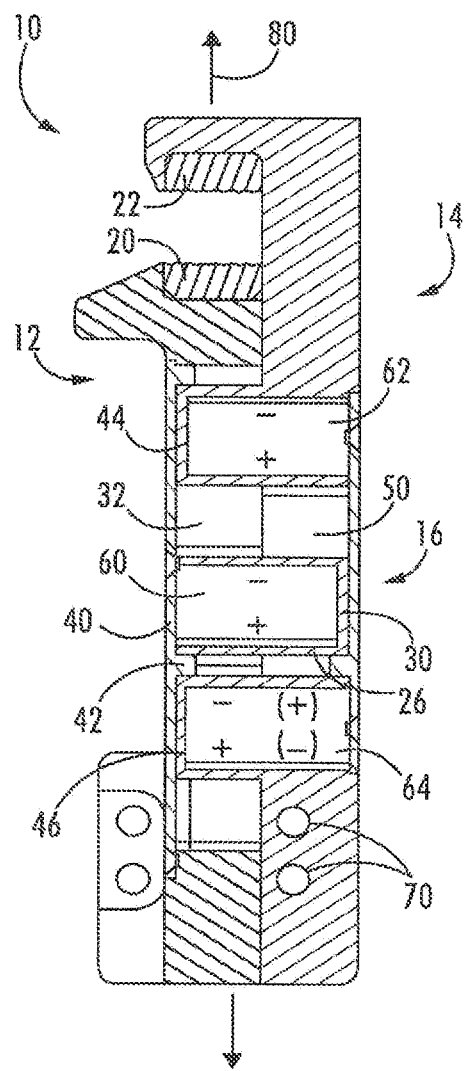
FIGS. 4A and 4B are sectional views taken along line 4-4 of FIG. 1 with clamping surfaces in the open and closed positions, respectively.
Figure 4B:
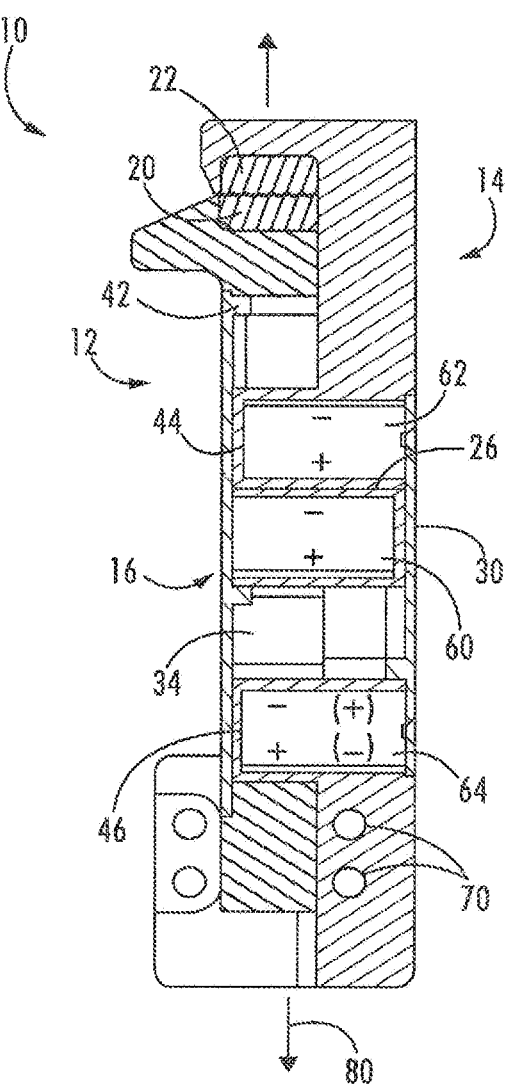

According to an embodiment of the present invention, referring to FIGS. 1-3, a magnetic pouch clamp assembly 10 includes slidably connected clamping arms 12, 14 carrying a magnet assembly 16. The magnet assembly 16 is operable to engage opposed clamping surfaces 20, 22 of the clamping arms 12, 14 in the open (FIG. 4A) and closed positions (FIG. 4B).

The clamping arm 12 includes a magnet housing 24 extending laterally therefrom through the clamping arm 14. Magnet housing retention lugs 26 extend upwardly and downwardly from a distal end 30 of the housing 24. Guide slots 32, 34 are defined in the clamping arm 12 extending across a width thereof.

Guide slot retention lug passages 36 are defined extending upwardly and downwardly from the guide slots 32, 34. A guide slot cover 40 is attached to the clamping arm 12 over outer ends of the guide slots 32, 34. Magnet housing blocking protrusions 42 extend into the guide slot retention lug passages 36 from an inner surface of the cover 40.

The clamping arm 14 includes magnet housings 44, 46 extending laterally therefrom and slidably accommodated, respectively, in the guide slots 32, 34 of the first clamping arm 12. The clamping arm 14 defines a guide slot 50 extending across a width thereof, which slidably receives the magnet housing 24 of the first clamping arm 12.

Magnet housing retention lugs 26 extend upwardly and downwardly from the distal ends 52, 54 of the magnet housings 44, 46. The guide slot 50 defines guide slot retention lug passages 36 extending downwardly and upwardly therefrom. A guide slot cover 56 is attached to the clamping arm 14 over outer ends of the guide slot 50 and includes a magnet housing blocking protrusion 42 extending inwardly therefrom into the passages 36.

Each of the lugs 26 extend upwards or downwards beyond the height of respective guide slot 32, 34, 46, which prevents lateral separation of the clamping arms 12, 14 by retaining each magnet housing 26, 44, 46 within its respective guide slot 32, 34, 36. The clamping arms 12, 14 are only separable by sliding them to align each lug 26 with a respective one of the passages 36. Because the blocking protrusions 42 extend into the passages 36 with the guide slot covers 40, 56 in place, the covers 40, 56 must be removed prior to separating the arms 12, 14—preventing inadvertent separation during normal opening and closing operations of the clamp assembly 10.

The magnet assembly 16 includes magnets 60, 62, 64, each located in a respective one of the magnet housings 24, 44, 46. The magnets 60, 62, 64 are preferably rare earth magnets, such as neodymium or samarium-cobalt magnets, although electromagnets could be used within the scope of the present invention.

The polarities +/− (see FIGS. 4A, 4B) of the magnets 60, 62 are oriented such that an attractive force therebetween holds the clamping surfaces 20, 22 in the closed position. The polarity +/− of the magnet 64 is preferably oriented relative to that of the magnet 60 such that an attractive force therebetween holds the clamping surfaces 20, 22 in the open position, and more particularly, a fully open position.

This is advantageous in that application of force is required only to transition the clamping surfaces 20, 22 between the open and closed position, and not to maintain the surfaces 20, 22 in either position. Alternately, the polarity (+)/(−) of the magnet 64 is oriented relative to that of the magnet 60 such that a repulsive force therebetween urges the clamping surfaces 20, 22 toward the closed position, reducing the energy required for this transition.

Advantageously, each magnet 60, 62, 64 is situated in its respective magnet housing 24, 44, 46 with a plurality of shims 66. The spacing between the magnets 60, 62 and between the magnets 60, 64 can be adjusted by moving some or all of the shims 66 in a magnet housing 24, 44, 46 to the other side of the magnet 60, 62, 64. The guide slot covers 40, 50 help ensure that the magnets 60, 62, 64 and shims 66 remain in their respective housings 24, 44, 46.

The use of three magnets in each magnet assembly is preferred because it minimizes the number of magnets while still allowing the clamp assembly to be held by magnetic attraction in both the closed and open positions. It will be appreciated that two or more pairs of magnets could be used to the same effect simply by modifying the clamping arms to include a corresponding number of additional magnet housings and guide slots. Likewise, the present invention could be used with only a single pair of magnets, such that magnet attraction only holds the clamp assembly to be held closed (or open).

In operation, the clamping arm 14 is mounted to a carriage via the mounting holes 70, with the clamping arm 12 slidably mounted thereto. An engagement roller 72 extending from the clamping arm 12 is engaged by an external mechanism to transition the magnetic clamp assembly 10 between open and closed positions.

Pouch retention when closed is enhanced by knurled or otherwise textured finishes on opposing faces of the clamping surfaces 20, 22. Since the clamping arms 12, 14 are laterally adjacent, a lateral extension 74 at the distal end 76 of the clamping arm 14 to allow the clamping surface 22 to be located coaxially along a clamping axis opposed to the clamping surface 20. A lateral extension 82 at the distal end 84 of the clamping arm 12 is angled away from the clamping surface 20 and facilitates pouch loading.

The abutting inner sides of the clamping arms 12, 14 preferably completely cover the inner openings of the guide slots 32, 34, 50 while the outer openings of the guide slots 32, 34, 50 are completely covered by the covers 40, 56. This arrangement advantageously inhibits fine particulates commonly encountered during pouching operations from entering the guide slots 32, 34, 50 and interfering with the opening and closing of the clamp assembly 10.

Figure 5:
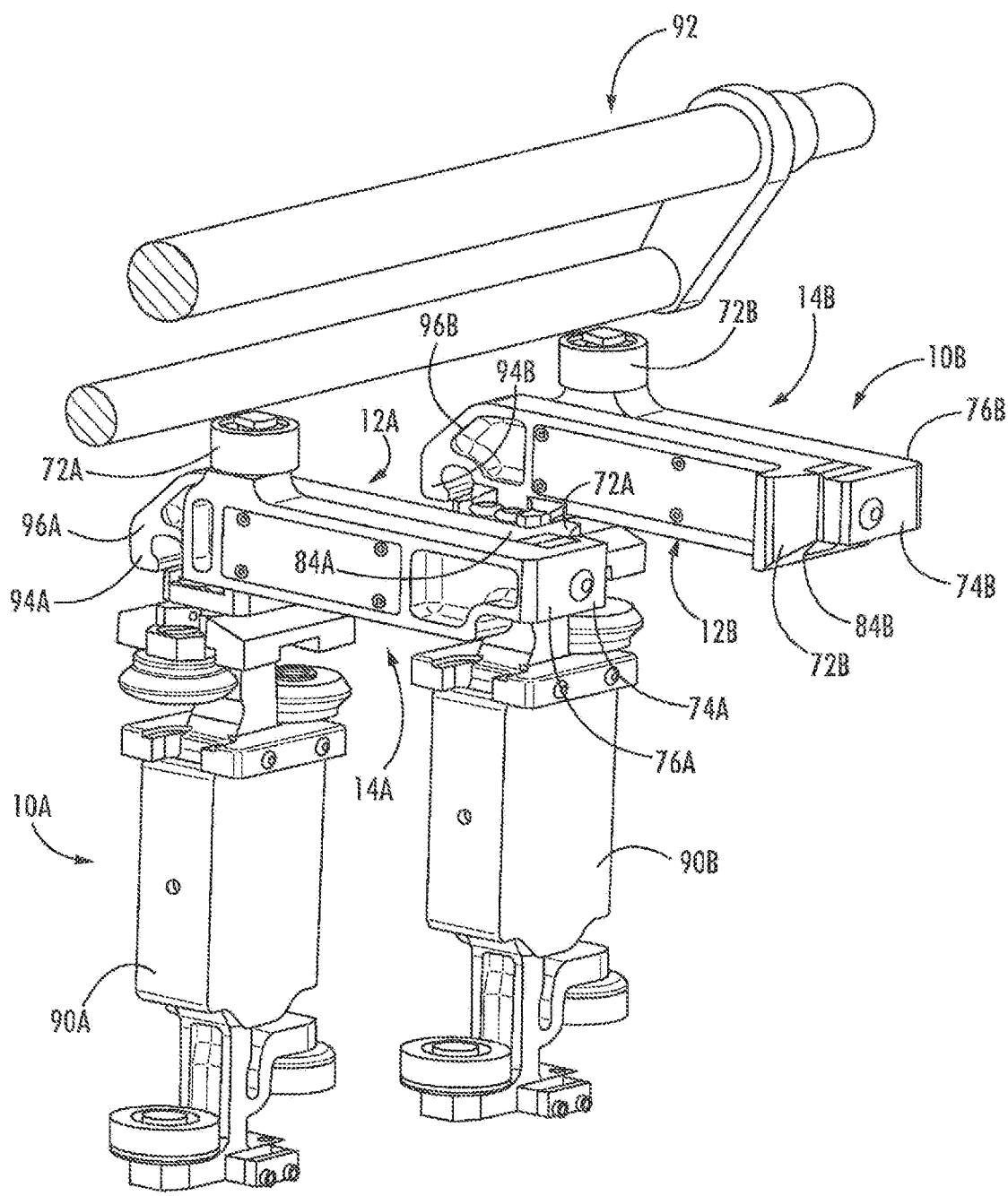
FIG. 5 is a perspective view of a pair of magnetic pouch clamp assemblies mounted to carriages, according to another embodiment of the present invention.
Figure 6:
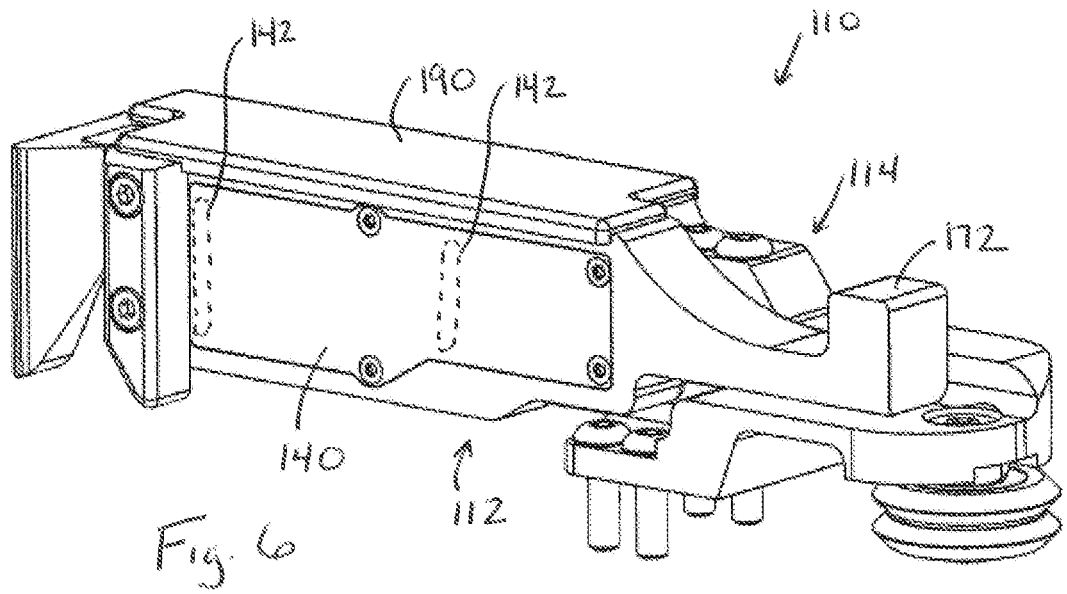
FIG. 6-9 show perspective views of another embodiment of a magnetic pouch clamp assembly.
Figure 7:
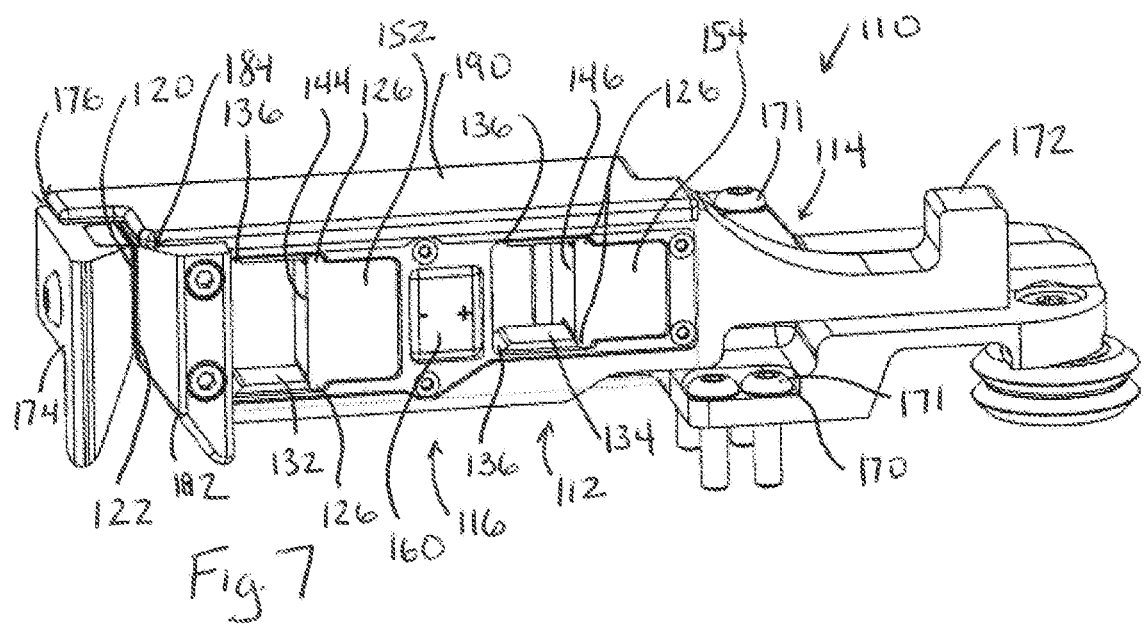
Figure 8:
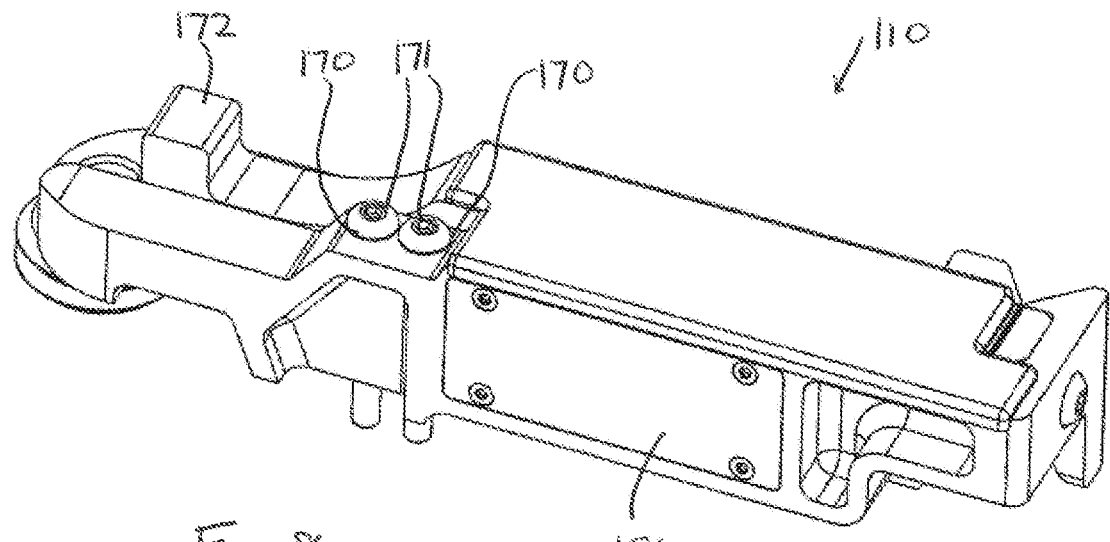
Figure 9:
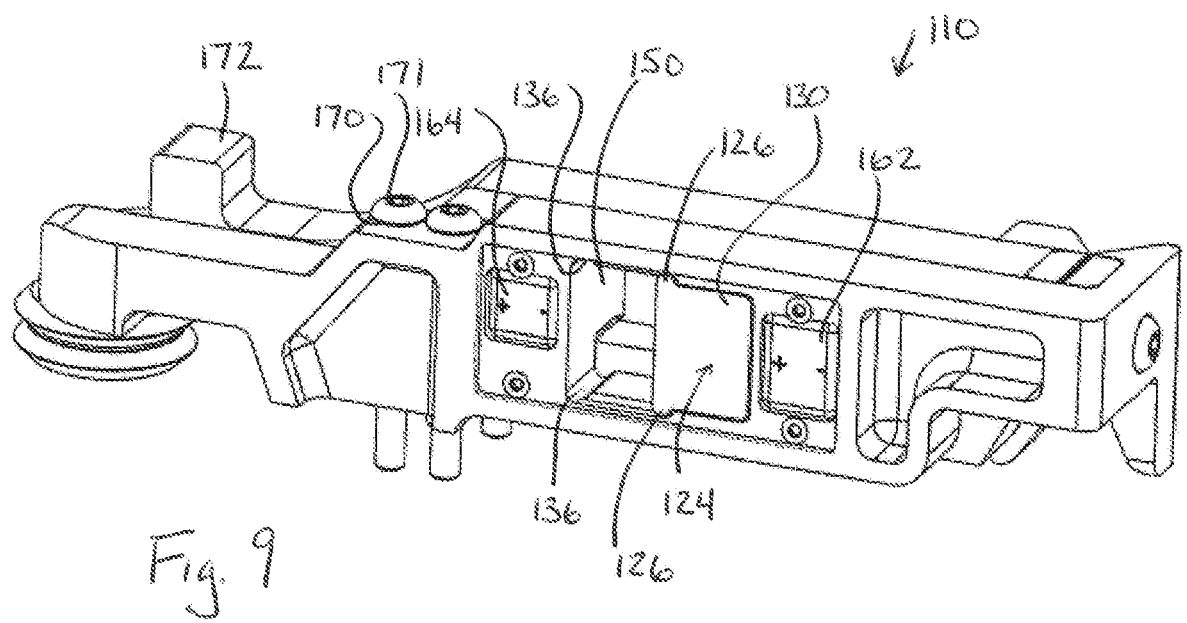
Figure 10:
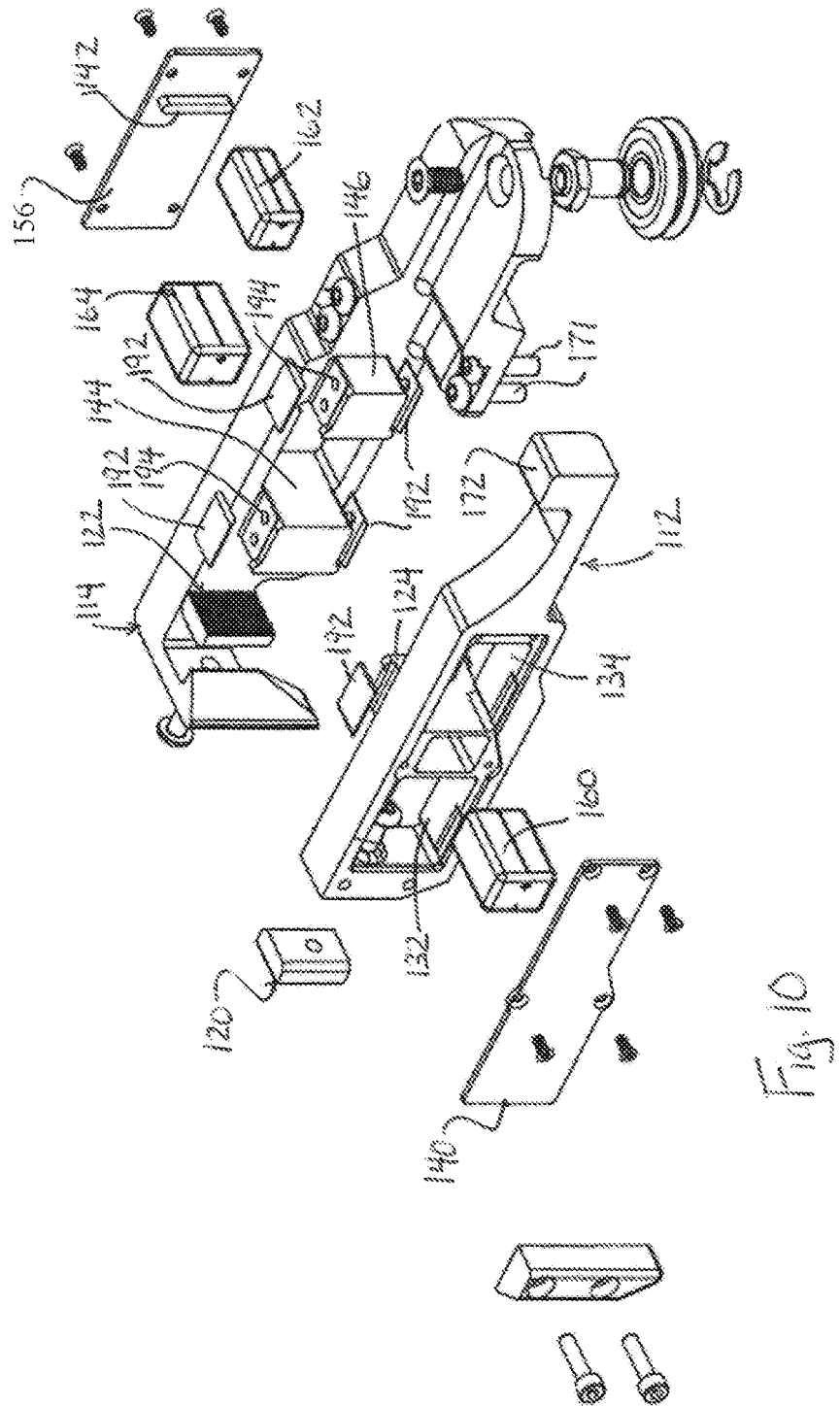
FIG. 10 shows an exploded perspective view of the magnetic pouch assembly of FIG. 9.
Figure 11:
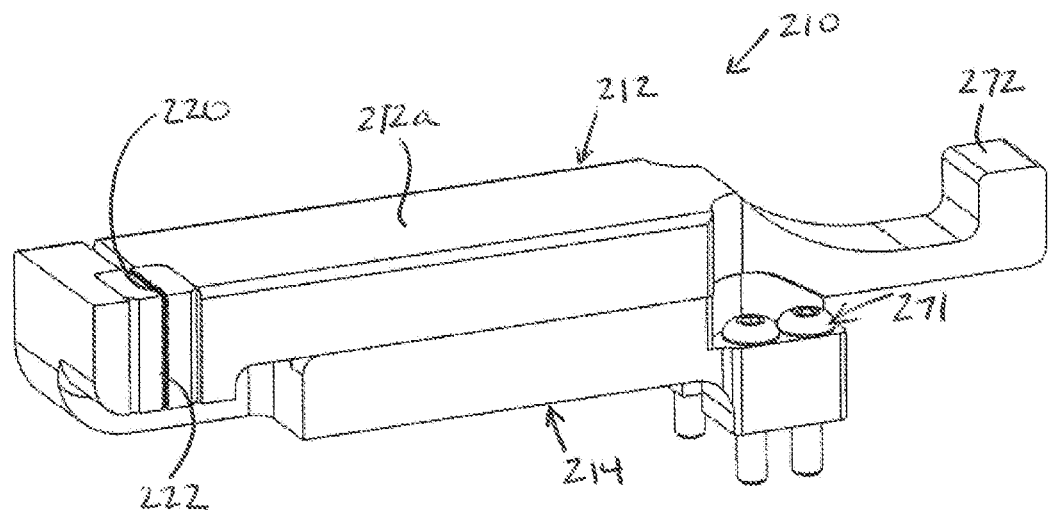
FIGS. 11-14 show perspective views of another embodiment of a magnetic pouch assembly (in FIGS. 12 and 14 clamping arm 212 is shown transparent of ease of understanding)
Figure 12:
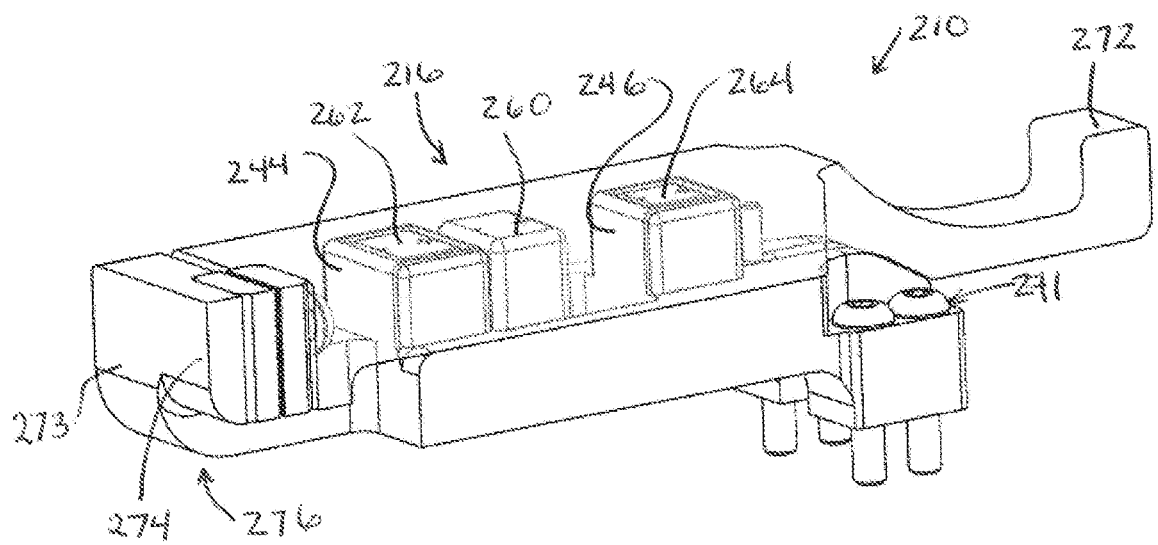
Figure 13:
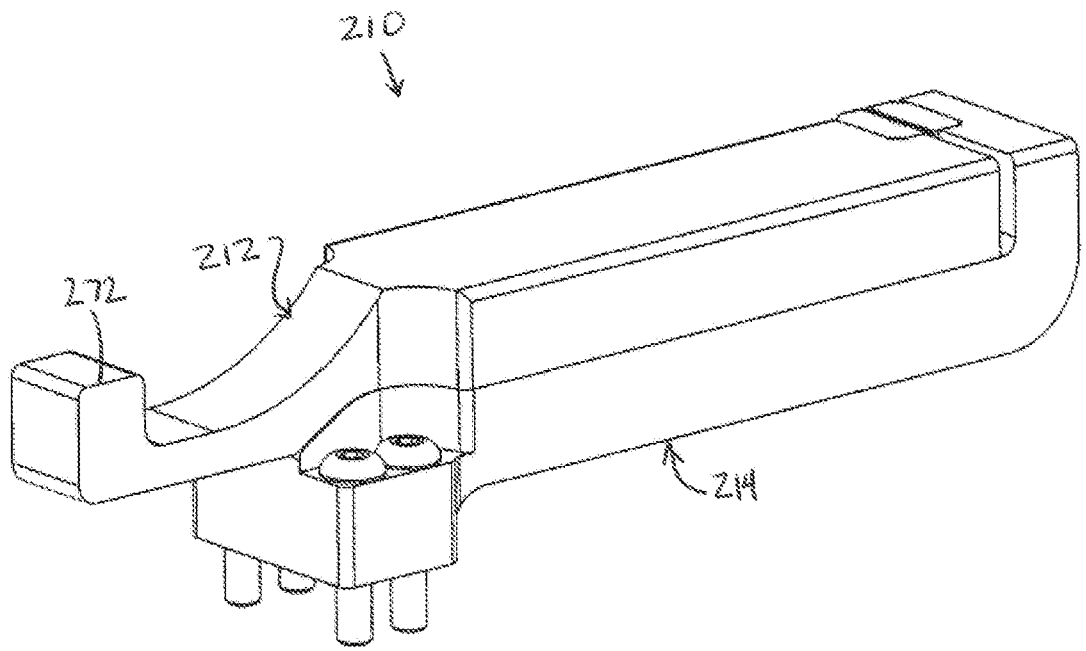
Figure 14:
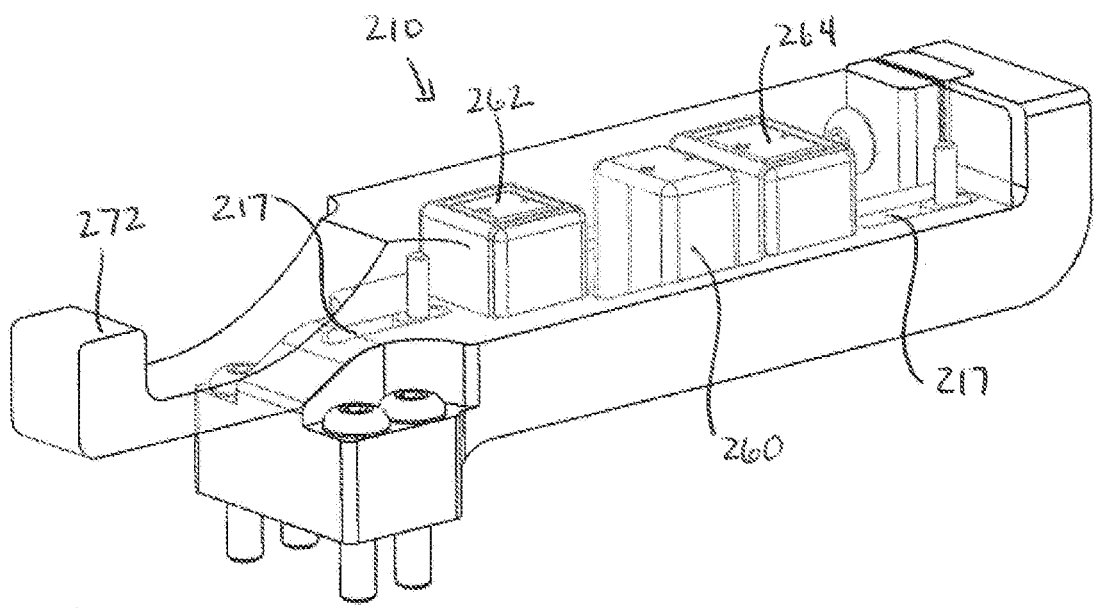
Figure 15:
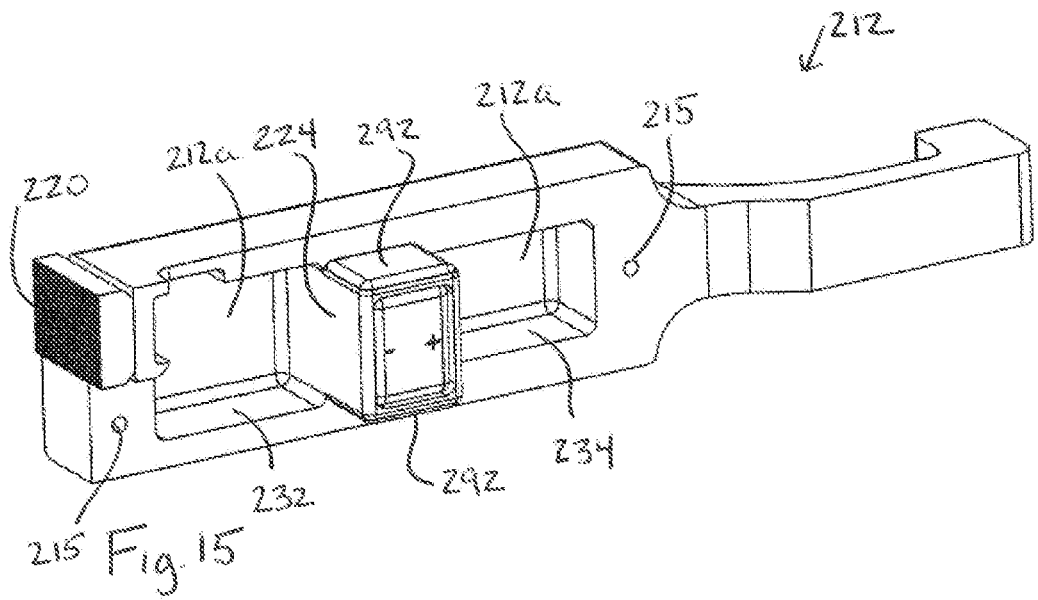
FIG. 15 shows one clamping arm of the assembly.

Referring to FIG. 5, according to another embodiment of the present invention, a pair of magnetic pouch clamp assemblies 10A, 10B are each mounted on adjacent carriages 90A, 90B. The clamp assemblies 10A, 10B are mirror-images of one another, such that lateral extensions 74A/B, 82A/B on the distal ends 76A/B, 84A/B of the clamping arms 12A/B, 14A/B extend toward one another, allowing both side of a pouch to accommodated therebetween.

It will be noted that, in the clamp assemblies 10A, 10B, the outboard clamping arms 14A, 14B carry the engagement rollers 72A, 72B while the inboard clamping arms 12A, 12B are mounted to the carriages 90A, 90B. A roller engagement mechanism 92 is positioned to engage the rollers 72A, 72B to simultaneously urge both the clamp assemblies 10A, 10B into the open position.

To help counteract the force exerted on the clamp assemblies 10A, 10B and carriages 90A, 90B, retentions mechanisms 94A, 94B (such as the depicted hooks) are located on proximal ends 96A, 96B of the mounted clamping arms 12A, 12B. These mechanisms 94A, 94B are able to engage a rail or other fixed structure at opening positions for the assemblies 10A, 10B, thereby preventing unwanted movement thereof.

According to another embodiment, referring to FIGS. 6-10, a magnetic pouch clamp assembly 110 includes slidably connected clamping arms 112, 114 carrying a magnet assembly 116. The magnet assembly 116 is operable to engage opposed clamping surfaces 120, 122 of the clamping arms 112, 114 in open and closed positions.

The clamping arm 112 includes a magnet housing 124 extending laterally therefrom through the clamping arm 114. Magnet housing retention lugs 126 extend upwardly and downwardly from a distal end 130 of the housing 124. Guide slots 132, 134 are defined in the clamping arm 112 extending across a width thereof.

Guide slot retention lug passages 136 are defined extending upwardly and downwardly from the guide slots 132, 134. A guide slot cover 140 is attached to the clamping arm 112 over outer ends of the guide slots 132, 134. Magnet housing blocking protrusions 142 extend into the guide slot retention lug passages 136 from an inner surface of the cover 140.

The clamping arm 114 includes magnet housings 144, 146 extending laterally therefrom and slidably accommodated, respectively, in the guide slots 132, 134 of the first clamping arm 112. The clamping arm 114 defines a guide slot 150 extending across a width thereof, which slidably receives the magnet housing 124 of the first clamping arm 112.

Magnet housing retention lugs 126 extend upwardly and downwardly from the distal ends 152, 154 of the magnet housings 144, 146. The guide slot 150 defines guide slot retention lug passages 136 extending downwardly and upwardly therefrom. A guide slot cover 156 is attached to the clamping arm 114 over outer ends of the guide slot 150 and includes a magnet housing blocking protrusion 142 extending inwardly therefrom into the passages 136.

Each of the lugs 126 extend upwards or downwards beyond the height of respective guide slot 132, 134, 146, which prevents lateral separation of the clamping arms 112, 114 by retaining each magnet housing 126, 144, 146 within its respective guide slot 132, 134, 136. The clamping arms 112, 114 are only separable by sliding them to align each lug 126 with a respective one of the passages 136. Because the blocking protrusions 142 extend into the passages 136 with the guide slot covers 140, 156 in place, the covers 140, 156 must be removed prior to separating the arms 112, 114—preventing inadvertent separation during normal opening and closing operations of the clamp assembly 110.

The magnet assembly 116 includes magnets 160, 162, 164, each located in a respective one of the magnet housings 124, 144, 146. The magnets 160, 162, 164 are preferably rare earth magnets, such as neodymium or samarium-cobalt magnets, although electromagnets could be used within the scope of the present invention. In this embodiment, shims are not used, and therefore the magnet housings are sized to closely match the magnet dimensions.

The polarities +/− of the magnets 160, 162 are oriented such that an attractive force therebetween holds the clamping surfaces 120, 122 in the closed position. The polarity +/− of the magnet 164 is preferably oriented relative to that of the magnet 160 such that an attractive force therebetween holds the clamping surfaces 120, 122 in the open position, and more particularly, a fully open position.

The use of three magnets in each magnet assembly is preferred because it minimizes the number of magnets while still allowing the clamp assembly to be held by magnetic attraction in both the closed and open positions. It will be appreciated that two or more pairs of magnets could be used to the same effect simply by modifying the clamping arms to include a corresponding number of additional magnet housings and guide slots. Likewise, the present invention could be used with only a single pair of magnets, such that magnet attraction only holds the clamp assembly to be held closed (or open).

In operation, the clamping arm 114 is mounted to a carriage via the mounting holes 170 and fasteners 171, with the clamping arm 112 slidably mounted thereto. An engagement post 172 extending from the clamping arm 112 is engaged by an external mechanism to transition the magnetic clamp assembly 110 between open and closed positions.

Pouch retention when closed is enhanced by knurled or otherwise textured finishes on opposing faces of the clamping surfaces 120, 122. Since the clamping arms 112, 114 are laterally adjacent, a lateral extension 174 at the distal end 176 of the clamping arm 114 to allow the clamping surface 122 to be located coaxially along a clamping axis opposed to the clamping surface 120. A lateral extension 182 at the distal end 184 of the clamping arm 112 is angled away from the clamping surface 120 and facilitates pouch loading.

The abutting inner sides of the clamping arms 112, 114 preferably completely cover the inner openings of the guide slots 132, 134, 150 while the outer openings of the guide slots 132, 134, 150 are completely covered by the covers 140, 156. This arrangement advantageously inhibits fine particulates commonly encountered during pouching operations from entering the guide slots 132, 134, 150 and interfering with the opening and closing of the clamp assembly 110. Here, a top cover 190 is also provided over the adjacent clamping arms for reducing ingress of dust or particles into the sliding joint between the two clamping arms.

Each of the magnet housings 124, 144 and 146 includes upper and lower sides that carry a plastic bearing 192 (e.g., here in plate form attachable via openings 194 in the magnet housings). The external surfaces of the plastic bearings 192 are in sliding contact with the guide slots and facilitate the relative sliding of the first and second clamping arms 112, 114. The plastic bearings 192 are particularly useful when the first and second clamping arms are formed of metal (e.g., aluminum or stainless steel).

According to another embodiment, referring to FIGS. 11-17, a magnetic pouch clamp assembly 210 includes slidably connected clamping arms 212, 214 carrying a magnet assembly 216. The magnet assembly 216 is operable to engage opposed clamping surfaces 220, 222 of the clamping arms 212, 214 in open and closed positions.

The clamping arm 212 includes a magnet housing 224 extending downwardly therefrom into the clamping arm 214. Upwardly extending guide slots 232, 234 are defined in the clamping arm 212 extending across a width thereof. Here, the guide slots 232, 234 are closed at the top by a wall portion 212a of the clamping arm 212. The clamping arm 212 also includes fastener receiving openings 215.

The clamping arm 214 includes magnet housings 244, 246 extending upwardly therefrom and slidably accommodated, respectively, in the guide slots 232, 234 of the first clamping arm 212. The clamping arm 214 defines a guide slot 250 extending across a width thereof, which slidably receives the magnet housing 224 of the first clamping arm 212. The guide slot 250 is closed at the bottom by wall portion 214a of the clamping arm 214. The clamping arm 214 also includes slide slots 217 though which fasteners 219 extend (into the openings 215) in order to hold the first and second clamping arms together. Shaft segments of the fasteners 219 move along the slide slots 217 during transition of the first and second clamping arms between the open and closed positions.

The magnet assembly 216 includes magnets 260, 262, 264, each located in a respective one of the magnet housings 224, 244, 246. The magnets 260, 262, 264 are preferably rare earth magnets, such as neodymium or samarium-cobalt magnets, although electromagnets could be used within the scope of the present invention. In this embodiment, shims are not used, and therefore the magnet housings are sized to closely match the magnet dimensions.

The polarities +/− of the magnets 260, 262 are oriented such that an attractive force therebetween holds the clamping surfaces 220, 222 in the closed position. The polarity +/− of the magnet 264 is preferably oriented relative to that of the magnet 260 such that an attractive force therebetween holds the clamping surfaces 220, 222 in the open position, and more particularly, a fully open position.

In operation, the clamping arm 214 is mounted to a carriage via the mounting holes 270 and fasteners 271, with the clamping arm 212 slidably mounted thereto. An engagement post 272 extending from the clamping arm 212 is engaged by an external mechanism to transition the magnetic clamp assembly 210 between open and closed positions.

Pouch retention when closed is enhanced by knurled or otherwise textured finishes on opposing faces of the clamping surfaces 220, 222. Here, first clamping arm 112 overlies the second clamping arm 214. The distal end 276 of clamping arm 214 includes an upward extension 273 with a lateral extension 274 to allow the clamping surface 222 to be located coaxially along a clamping axis opposed to the clamping surface 220.

Figure 16:
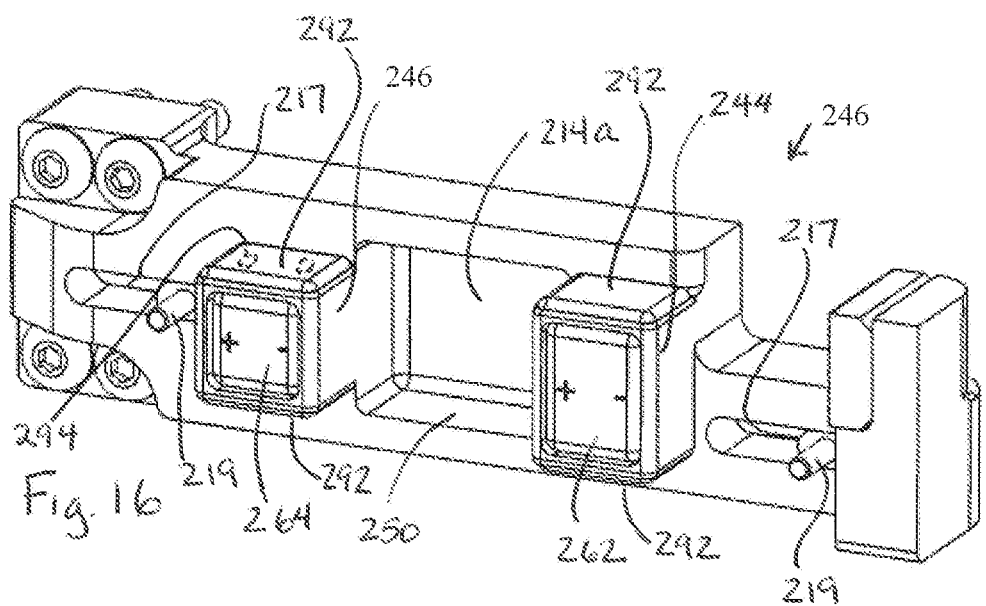
FIG. 16 shows another clamping arm of the assembly.
Figure 17:
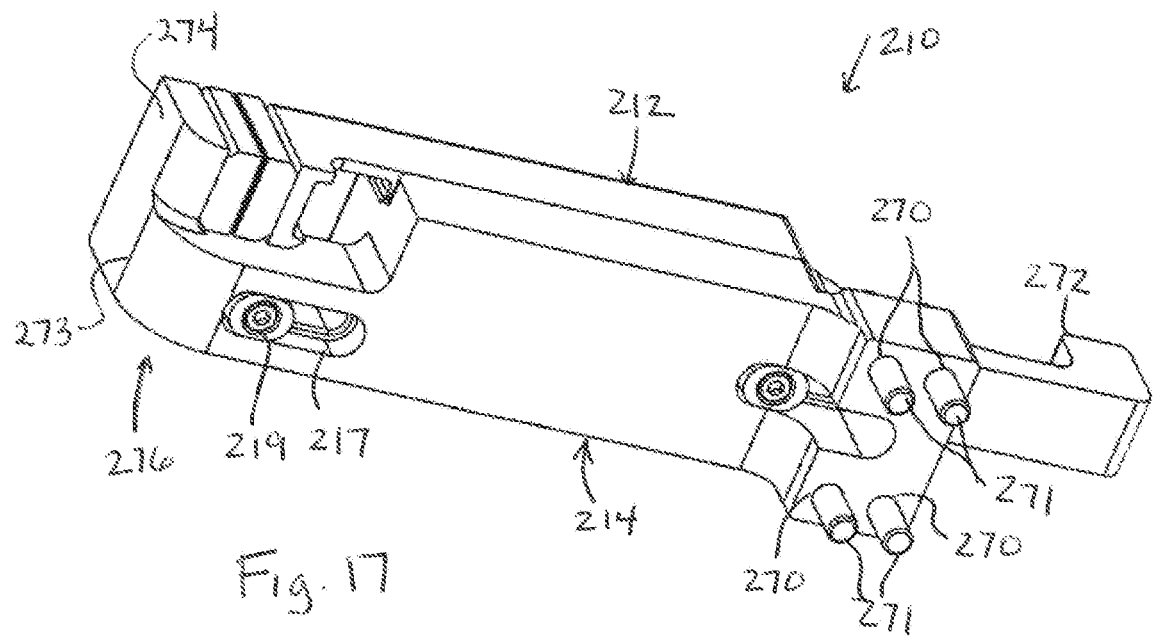
FIG. 17 is another perspective view of the assembly.

Each of the magnet housings 224, 244 and 246 includes upper and lateral sides that carry a plastic bearing 292 (e.g., here in plate form attachable via openings 294, represented in dashed line in FIG. 16, in the magnet housings). The external surfaces of the plastic bearings 292 are in sliding contact with the guide slots and facilitate the relative sliding of the first and second clamping arms 212, 214. The plastic bearings 292 are particularly useful when the first and second clamping arms are formed of metal (e.g., aluminum or stainless steel).

Referring now to FIG. 18, an exemplary pouch handling system 300 (e.g., a pouch filling system) is shown. The system includes carriages 302 mounted for independent movement along a continuous conveyor track 304. Opposed pairs of magnetic pouch clamp assemblies 306 (e.g., any of the assemblies 10, 110 or 210) are mounted to each of the carriages 302 for movement therewith. An assembly actuator 312 is positioned at a pouch drop location or zone 314 along the continuous conveyor track 304. The assembly actuator 312 is configured to interact with the magnetic pouch clamp assemblies to shift the first and second clamping arms to the open position for pouch dropping. An assembly actuator 308 is positioned at a pouch receive location or zone 310 along the continuous conveyor track 304. The assembly actuator 308 is configured to interact with the magnetic pouch clamp assemblies to shift the first and second clamping arms to the closed position for pouch holding. The actuators 308 and 312 may, for example, be linear actuators (e.g., pneumatic motor driven) which move a paddle or plate that interacts with the clamp assemblies 306. The system 300 is configured such that the magnetic pouch clamp assemblies (i) receive a pouch at the pouch receive location 308, (ii) drops the pouch at the pouch drop location 314 and (iii) remains in the open position while traversing along the continuous conveyor track 304 (in the direction of the arrows) from the pouch drop location back to the pouch receive location to receive another pouch. The system may include various processes that act on or with respect to the pouches between locations 308 and 314.

In examples:

A magnetic pouch clamp assembly includes a first clamping arm having a first clamping surface; a second clamping arm having a second clamping surface opposed to the first clamping surface, the second clamp arm being slidably connected to the first clamping arm such that the first and second clamping arms are movable between open and closed positions, the first and second clamping surfaces being engaged in the closed position; and a magnet assembly including a first magnet having a first polarity carried by the first clamping arm and a second magnet having a second polarity carried by the second clamping arm, the first and second polarities being oriented such that a closing attractive force therebetween holds the first and second clamping surfaces in the closed position.

In implementations, the magnet assembly includes a third magnet having a third polarity carried by the second clamping arm, the second and third magnets being located on opposite sides of the first magnet and the first and third polarities being oriented such that an opening attractive force therebetween holds the first and second clamping surfaces in the open position.

In implementations, the first clamping arm defines a first guide slot and the second clamping arm defines a second guide slot, the first clamping arm includes a first magnet housing slidably received in the second guide slot and carrying the first magnet, and the second clamping arm includes a second magnet housing slidably received in the first guide slot and carrying the second magnet.

In implementations, the magnet assembly further includes at least one first magnet shim located in the first magnet housing with the first magnet, the first magnet shim being repositionable to adjust a spacing between the first and second magnets.

In implementations, the magnet assembly further includes at least one second magnet shim located in the second magnet housing with the second magnet, the second magnet shim being repositionable to further adjust the spacing between the first and second magnets.

In implementations, the first magnet housing includes a first magnet housing retention lug at a first magnet housing distal end and the second guide slot includes a second guide slot retention lug passage extending across a width thereof, engagement between the first magnet housing retention lug and the second clamping arm preventing removal of the first magnet housing from the second guide slot except when the first magnet housing retention lug and the and the second guide slot retention lug passage are aligned.

In implementations, the second clamping arm includes a second clamping arm guide slot cover connected thereto outwardly of the first magnet housing retention lug, the second clamping arm guide slot cover having a magnet housing blocking protrusion extending inwardly therefrom positioned to prevent the first magnet housing retention lug from sliding into aligned with the second guide slot retention lug passage.

In implementations, the second magnet housing includes a second magnet housing retention lug at a second magnet housing distal end and the first guide slot includes a first guide slot retention lug passage extending across a width thereof, engagement between the second magnet housing retention lug and the first clamping arm preventing removal of the second magnet housing from the first guide slot except when the second magnet housing retention lug and the and the first guide slot retention lug passage are aligned.

In implementations, the magnet assembly includes a third magnet having a third polarity carried by the second clamping arm, the second and third magnets being located on opposite sides of the first magnet and the first and third polarities being oriented such that an opening attractive force therebetween holds the first and second clamping surfaces in the open position; and wherein the first clamping arm defines a third guide slot and the second clamping arm includes a third magnet housing slidably received in the third guide slot and carrying the third magnet.

In implementations, one of the first and second clamping arms includes mounting holes for mounting to a carriage.

In implementations, another of the first and second clamping arms includes an engagement roller for engagement to move the first and second clamping surfaces between the open and closed positions.

In implementations, a first clamping arm distal end extends beyond a second clamping arm distal end, the first clamping arm distal end including a first end lateral extension, the first clamping surface being located on the lateral extension facing the second clamping surface on the second clamping arm distal end.

In implementations, the second clamping arm distal end includes a second end lateral extension extending away from the first clamping arm and angled away from the second clamping surface.

In implementations, the first and second clamping surfaces are textured to increase grip.

In implementations, the first and second magnets are permanent magnets.

The above-described embodiments are provided for illustrative purposes; the present invention is not necessarily limited thereto. Rather, those skilled in the art will appreciate that various modifications, as well as adaptations to particular circumstances, will fall within the scope of the invention herein shown and described, and of the claims appended hereto.

What is claimed is:

1. A magnetic pouch clamp assembly comprising:
    a first clamping arm having a first clamping surface;
    a second clamping arm having a second clamping surface opposed to the first clamping surface;
    wherein the first clamping arm and the second clamping arm are slidably connected together for relative movement between an open position and a closed position, the first and second clamping surfaces being spaced apart in the open position and the first and second clamping surfaces being engaged in the closed position;
    a magnet assembly including a first magnet having a first polarity carried by the first clamping arm and a second magnet having a second polarity carried by the second clamping arm, the first and second polarities being oriented such that a closing attractive force therebetween holds the first and second clamping arms in the closed position;
    wherein the first clamping arm defines a first guide slot and the second clamping arm defines a second guide slot, the first clamping arm includes a first magnet housing projecting into and slidably received in the second guide slot and carrying the first magnet such that the first magnet is at least partly positioned within the second guide slot, and the second clamping arm includes a second magnet housing projecting into and slidably received in the first guide slot and carrying the second magnet such that the second magnet is at least partly positioned within the first guide slot.

2. The assembly of claim 1, wherein the magnet assembly includes a third magnet having a third polarity carried by the second clamping arm, the second and third magnets being located on opposite sides of the first magnet and the first and third polarities being oriented such that an opening attractive force therebetween holds the first and second clamping arms in the open position.

3. The assembly of claim 1, wherein the first magnet housing includes opposite sides within the second guide slot, wherein each of the opposite sides carries a plastic bearing in sliding contact with the second guide slot, wherein the second magnet housing includes opposite sides within the first guide slot, wherein each of the opposite sides of the second magnet housing carries a plastic bearing in sliding contact with the first guide slot.

4. The assembly of claim 1, wherein the magnet assembly includes a third magnet having a third polarity carried by the second clamping arm, the second and third magnets being located on opposite sides of the first magnet and the first and third polarities being oriented such that an opening attractive force therebetween holds the first and second clamping arms in the open position; and
   wherein the first clamping arm defines a third guide slot and the second clamping arm includes a third magnet housing slidably received in the third guide slot and carrying the third magnet.

5. The assembly of claim 1, wherein one of the first and second clamping arms includes mounting holes for mounting to a carriage.

6. The assembly of claim 1, wherein a first clamping arm distal end extends beyond a second clamping arm distal end, the first clamping arm distal end including a first end lateral extension, the first clamping surface being located on the lateral extension and facing the second clamping surface on the second clamping arm distal end.

7. The assembly of claim 6, wherein the second clamping arm distal end includes a second end lateral extension extending away from the first clamping arm and angled away from the second clamping surface.

8. The assembly of claim 6, wherein the first and second clamping surfaces are textured to increase grip.

9. The assembly of claim 1, wherein the first and second magnets are permanent magnets.

10. The assembly of claim 1, wherein the first clamping arm overlies the second clamping arm, wherein the second magnet housing extends upward into the first guide slot, wherein the first magnet housing extends downward into the second guide slot.

11. The assembly of claim 1, wherein the first magnet housing includes a first magnet housing retention lug at a first magnet housing distal end and the second guide slot includes a second guide slot retention lug passage extending across a width thereof, engagement between the first magnet housing retention lug and the second clamping arm preventing removal of the first magnet housing from the second guide slot except when the first magnet housing retention lug and the second guide slot retention lug passage are aligned.

12. The assembly of claim 11, wherein the second clamping arm includes a second clamping arm guide slot cover connected thereto outwardly of the first magnet housing retention lug, the second clamping arm guide slot cover having a magnet housing blocking protrusion extending inwardly therefrom positioned to prevent the first magnet housing retention lug from sliding into alignment with the second guide slot retention lug passage.

13. The assembly of claim 11, wherein the second magnet housing includes a second magnet housing retention lug at a second magnet housing distal end and the first guide slot includes a first guide slot retention lug passage extending across a width thereof, engagement between the second magnet housing retention lug and the first clamping arm preventing removal of the second magnet housing from the first guide slot except when the second magnet housing retention lug and the and the first guide slot retention lug passage are aligned.

14. A magnetic pouch clamp assembly comprising:
   a first clamping arm having a first clamping surface;
   a second clamping arm having a second clamping surface opposed to the first clamping surface;
   wherein the first clamping arm and the second clamping arm are slidably connected together for relative movement between an open position and a closed position, the first and second clamping surfaces being spaced apart in the open position and the first and second clamping surfaces being engaged in the closed position;
   a magnet assembly including a first magnet having a first polarity carried by the first clamping arm and a second magnet having a second polarity carried by the second clamping arm, the first and second polarities being oriented such that a closing attractive force therebetween holds the first and second clamping arms in the closed position;
   wherein at least one of the first clamping arm or the second clamping arm includes at least one slide slot, wherein a fastener extends through the slide slot and into the other of the first clamping arm or the second clamping arm to hold the first and second clamping arms together, wherein the fastener includes a shaft portion within the slide slot, wherein the shaft portion interacts with an end of the slide slot for limiting relative sliding movement between the first clamping arm and the second clamping arm.

15. A pouch handling system, comprising:
   a carriage mounted for movement along a continuous conveyor track;
   a magnetic pouch clamp assembly, including:
      a first clamping arm having a first clamping surface;
      a second clamping arm having a second clamping surface opposed to the first clamping surface;
      wherein the first clamping arm and the second clamping arm are slidably connected together for relative movement between an open position and a closed position, the first and second clamping surfaces being spaced apart in the open position and the first and second clamping surfaces being engaged in the closed position;
      a magnet assembly including a first magnet having a first polarity carried by the first clamping arm and a second magnet having a second polarity carried by the second clamping arm, the first and second polarities being oriented such that a closing attractive force therebetween holds the first and second clamping arms in the closed position;
   wherein the magnetic pouch clamp assembly is mounted to the carriage for movement therewith;
   a first assembly actuator positioned at a pouch drop location along the continuous conveyor track, the first assembly actuator configured to interact with the magnetic pouch clamp assembly to shift the first and second clamping arms to the open position for pouch dropping;
   a second assembly actuator positioned at a pouch receive location along the continuous conveyor track, the second assembly actuator configured to interact with the magnetic pouch clamp assembly to shift the first and second clamping arms to the closed position for pouch holding;

wherein the system is configured such that the magnetic pouch clamp assembly (i) receives a pouch at the pouch receive location, (ii) drops the pouch at the pouch drop location and (iii) remains in the open position while traversing along the continuous conveyor track from the pouch drop location back to the pouch receive location to receive another pouch.

16. A magnetic pouch clamp assembly comprising:

a first clamping arm having a first clamping surface;

a second clamping arm having a second clamping surface opposed to the first clamping surface;

wherein the first clamping arm and the second clamping arm are slidably connected together for relative movement between an open position and a closed position, the first and second clamping surfaces being spaced apart in the open position and the first and second clamping surfaces being engaged in the closed position;

a magnet assembly including a first magnet having a first polarity carried by the first clamping arm and a second magnet having a second polarity carried by the second clamping arm, the first and second polarities being oriented such that a closing attractive force therebetween holds the first and second clamping arms in the closed position;

wherein the first clamping arm overlies the second clamping arm and a relative sliding action between the first clamping arm and the second clamping arm is in a direction along an axial length of the second clamping arm.

* * * * *